United States Patent
Katter et al.

(10) Patent No.: US 12,480,690 B2
(45) Date of Patent: Nov. 25, 2025

(54) REGENERATOR FOR A MAGNETIC HEAT EXCHANGER AND HEAT EXCHANGER

(71) Applicant: Vacuumschmelze GmbH & Co KG, Hanau (DE)

(72) Inventors: Matthias Katter, Hanau (DE); Alexander Barcza, Hanau (DE); Hugo Abdiel Vieyra Villegas, Hanau (DE); Kilian Bartholomé, Ebringen (DE); Lena Maria Maier, Freiburg (DE); Patrick Corhan, Freiburg (DE); Manuel Näher, Solden (DE); Christian Vogel, Munich (DE)

(73) Assignee: Vacuumschmelze GmbH & Co KG, Hanau (DE)

( * ) Notice: Subject to any disclaimer, the term of this patent is extended or adjusted under 35 U.S.C. 154(b) by 183 days.

(21) Appl. No.: 18/446,767

(22) Filed: Aug. 9, 2023

(65) Prior Publication Data

US 2024/0053067 A1 Feb. 15, 2024

(30) Foreign Application Priority Data

Aug. 9, 2022 (DE) .......................... 102022120022.1

(51) Int. Cl.
*F25B 21/00* (2006.01)
*H01F 1/055* (2006.01)

(52) U.S. Cl.
CPC ........ *F25B 21/00* (2013.01); *F25B 2321/002* (2013.01); *H01F 1/0557* (2013.01)

(58) Field of Classification Search
CPC ........ H01F 1/015; H01F 1/0557; F25B 21/00; F25B 2321/002
See application file for complete search history.

(56) References Cited

U.S. PATENT DOCUMENTS 7,063,754 B2   6/2006   Fukamichi et al.
7,076,958 B2   7/2006   Saito et al.
(Continued)

FOREIGN PATENT DOCUMENTS

CN   112361643 A   2/2021
CN   112361644 A   2/2021
(Continued)

*Primary Examiner* — Filip Zec
(74) *Attorney, Agent, or Firm* — Dickinson Wright PLLC

(57) ABSTRACT

A regenerator for a magnetic heat exchanger is provided. The regenerator comprises a housing having a chamber, an inlet and outlet for a working medium, and a chamber volume V. At least one magnetocalorically active component is arranged in the chamber between the inlet and the outlet and has at least one inner flow channel with a hydraulic diameter $d_{hyd}$. The volume of the chamber not occupied by the magnetocalorically active component provides at least one bypass flow channel, both the inlet and the outlet being reached from the at least one bypass flow channel, and this bypass flow channel having a hydraulic diameter D, where $D > d_{hyd}$. The at least one inner flow channel of the magnetocalorically active component is in flow communication with the bypass flow channel. The magnetocalorically active component and the at least one bypass flow channel are arranged parallel to one another.

28 Claims, 5 Drawing Sheets

(56) References Cited

U.S. PATENT DOCUMENTS

| | | | | |
|---|---|---|---|---|
| 8,453,466 | B2* | 6/2013 | Chang | H10N 15/20 |
| | | | | 62/235.1 |
| 8,522,562 | B2* | 9/2013 | Ludtka | C22F 3/00 |
| | | | | 62/118 |
| 9,310,108 | B2* | 4/2016 | Kaji | F25B 21/00 |
| 10,096,411 | B2* | 10/2018 | Hu | F25B 21/00 |
| 10,472,694 | B2* | 11/2019 | Vieyra Villegas | H01F 1/015 |
| 10,612,668 | B1* | 4/2020 | Barclay | F25B 21/00 |
| 10,684,044 | B2* | 6/2020 | Schroeder | F25B 21/00 |
| 11,231,225 | B2* | 1/2022 | Holladay | F25J 1/0225 |
| 2002/0053209 | A1* | 5/2002 | Zimm | F25B 21/00 |
| | | | | 62/3.1 |
| 2004/0182086 | A1 | 9/2004 | Chiang et al. | |
| 2013/0061602 | A1 | 3/2013 | Kuo et al. | |
| 2013/0232993 | A1 | 9/2013 | Saito et al. | |
| 2015/0033763 | A1 | 2/2015 | Saito et al. | |
| 2018/0283772 | A1* | 10/2018 | Holladay | H01F 1/015 |
| 2019/0352747 | A1* | 11/2019 | Ihnfeldt | H01F 1/015 |
| 2022/0099366 | A1* | 3/2022 | Holladay | F25J 1/0225 |

FOREIGN PATENT DOCUMENTS

| | | |
|---|---|---|
| DE | 102014010476 B3 | 12/2015 |
| DE | 102015112 A1 | 2/2017 |

* cited by examiner

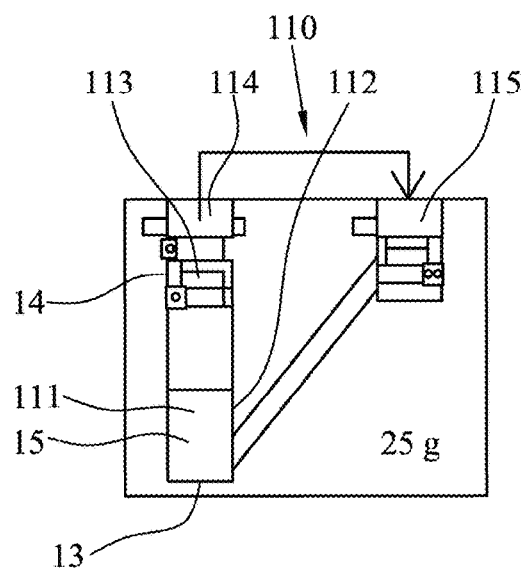
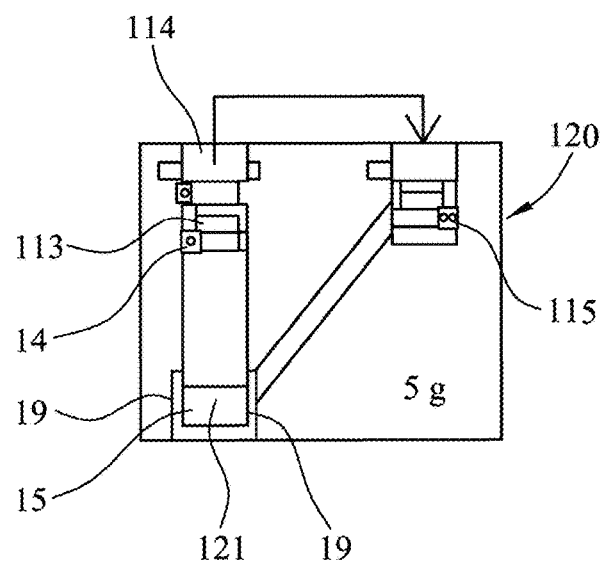
Fig. 3(a)          Fig. 3(b)
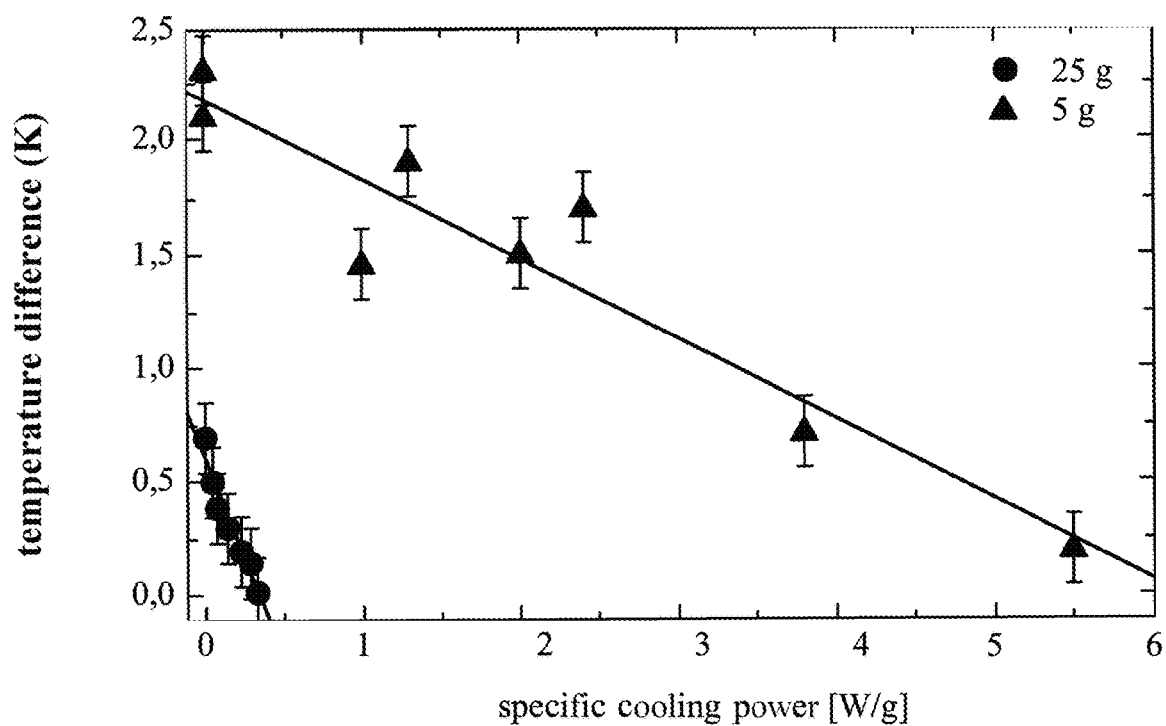
Fig. 3(c)

REGENERATOR FOR A MAGNETIC HEAT EXCHANGER AND HEAT EXCHANGER

This U.S. patent application claims priority to DE Pat. Application No. 10 2022 120 022.1, filed Aug. 9, 2022, the entire contents of which is incorporated herein by reference in its entirety.

BACKGROUND

1. Technical Field

The present invention relates to regenerator for a magnetic heat exchanger, in particular for a magnetic heat exchanger having a maximum operating frequency of at least 10 Hz, and to a heat exchanger, in particular a heat exchanger having a maximum operating frequency of at least 10 Hz.

2. Related Art

The magnetocaloric effect describes the adiabatic conversion of a magnetically induced change in entropy to generate or absorb heat. This effect is used in a magnetic heat exchanger in order to provide cooling and/or heating. Applying a magnetic field to a magnetocalorically active working material induces a change in entropy that results in heat generation or absorption.

Magnetic heat exchangers may be designed on the basis of different principles including, for example, the active regenerator principle, also known as the AMR (Active Magnetic Regeneration) process, or the heat pipe principle or heat pipe process.

U.S. Pat. No. 7,076,958 B2 discloses an example of a magnetic heat exchanger that operates according to the active regenerator principle and comprises a pump-driven circulation system, a heat exchange medium such as a coolant, for example, a chamber filled with particles of a magnetocalorically active material and a means for applying a magnetic field to the chamber.

DE 10 2014 010 476 B3 discloses an example of a magnetic heat exchanger that operates according to the heat pipe principle and discloses an air conditioning device that comprises at least one heat pipe, in particular a thermosiphon, and a magnetocaloric material under the temporary influence of a magnetic field.

A plurality of magnetocalorically active phases that have magnetic phase transition temperatures in a range that is suitable for the provision of domestic and commercial air conditioning units and cooling devices are known. One such magnetocalorically active material, as disclosed in U.S. Pat. No. 7,063,754, for example, has a $NaZn_{13}$-type crystal structure and can be represented by the general formula $La(Fe_{1-x-y}T_yM_x)_{13}H_z$, where M is at least one element from the group consisting of Si and Al and T can be one or more of the transition metal elements such as Co, Ni, Mn or Cr. The magnetic phase transition temperature of this material may be set by adjusting the composition.

Further improvements are desirable in order to enable more extensive applications of magnetic heat exchange technology. In particular, it is desirable to increase the power density of the regenerator.

SUMMARY

A regenerator for a magnetic heat exchanger is provided according to a first embodiment. The regenerator comprises a housing having a chamber, an inlet for a working medium and an outlet for the working medium, the chamber having a volume V, and at least one magnetocalorically active component that is arranged in the chamber between the inlet and the outlet and has at least one inner flow channel having a hydraulic diameter $d_{hyd}$. The volume of the chamber not occupied by the magnetocalorically active component provides at least one bypass flow channel. Both the inlet and the outlet are reached from the at least one bypass flow channel and this bypass flow channel has a hydraulic diameter D, where $D>d_{hyd}$. The at least one inner flow channel of the magnetocalorically active component is in flow communication with the bypass flow channel. A flow direction of the working medium extends from the inlet to the outlet, and the magnetocalorically active component and the at least one bypass flow channel are arranged in parallel to one another with respect to the direction of flow.

This regenerator is suitable for a heat exchanger that is operated according to the heat pipe principle.

In an alternative embodiment according to the invention, a regenerator for a magnetic heat exchanger is provided that also comprises a housing having a chamber, an inlet for a working medium and an outlet for the working medium, the chamber having a volume V, and at least one magnetocalorically active component that is arranged in the chamber between the inlet and the outlet and that has at least one inner flow channel having a hydraulic diameter $d_{hyd}$. The volume of the chamber not occupied by the magnetocalorically active component provides at least two bypass flow channels, each having a hydraulic diameter D, where $D>d_{hyd}$. The at least one inner flow channel of the magnetocalorically active component is in flow communication with at least two of the bypass flow channels. One of the bypass flow channels adjoins the inlet and another of the bypass flow channels adjoins the outlet. The at least two bypass flow channels are arranged in series with respect to one another with respect to the direction of flow.

This regenerator is suitable for a heat exchanger that is operates according to the active regenerator principle. Since the at least two bypass flow channels are arranged in series with respect to one another with respect to the direction of flow, the bypass flow channel, which adjoins the inlet, does not extend to the outlet, and the other bypass flow channel, which adjoins the outlet, does not extend to the inlet.

Both regenerators have a bypass flow channel for the working medium with a hydraulic diameter that is greater than the hydraulic diameter of the at least one inner flow channel that is formed in the magnetocalorically active component. This arrangement makes it possible to reduce pressure losses in the working medium and to increase the operating frequency of the heat exchanger, thereby increasing the power density of the regenerator.

In some embodiments a shortest lengths of the at least one inner flow channel is shorter than a length L of the magnetocalorically active component measured in the direction of the mean flow direction of the working medium. This ratio enables a further reduction in pressure losses. The length s indicates the shortest distance over which the working medium must flow in the inner flow channel. For example, in the case of a monolithic magnetocalorically active component for a heat pipe regenerator the length s is half the diameter of the component.

In embodiments in which the regenerator is used in a heat exchanger operated according to the heat pipe principle, the magnetocalorically active component may have a total cross-sectional area a that is smaller than an inner cross-sectional area A of the chamber. As a result, the bypass flow channel is formed between the magnetocalorically active component and the chamber.

In some embodiments the bypass flow channel is surrounded by the magnetocalorically active component. In some embodiments the bypass flow channel takes the form of at least one gap between the housing and the magnetocalorically active component. In some embodiments the bypass flow channel takes the form of at least one gap between the housing and the magnetocalorically active component and of at least one recess in the cross section of the magnetocalorically active component.

In some embodiments the magnetocalorically active component comprises of a plurality of sub-units, and the bypass flow channel takes the form of at least one gap that is created between these sub-units. In some embodiments the bypass flow channel takes the form of one or more openings in the sub-units. In some embodiments the bypass flow channel takes the form of both at least one gap created between the sub-units and one or more openings in the sub-units themselves.

In some embodiments, the sub-units are arranged adjacent to one another and transverse to the flow direction of the working medium in the chamber and/or on top of one another and parallel to the flow direction of the working medium in the chamber.

In some embodiments the regenerator has a macroscopic porosity $\varepsilon_{macro}$ calculated by dividing the volume Vbs of the bypass flow channel by the volume V of the chamber and a microscopic porosity $\varepsilon_{micro}$ calculated by dividing the volume of the inner flow channels Vis by the volume Vb of the magnetocalorically active component, where $10\%<\varepsilon_{macro}<50\%$ and $10\%<\varepsilon_{micro}<50\%$ and $19\%\leq\varepsilon_{total}\leq75\%$. Here, the total porosity $\varepsilon_{total}$ is calculated using the expression (Vbs+Vis)/V. This ratio enables a further reduction in pressure loss.

In some embodiments the magnetocalorically active component takes the form of individual magnetocalorically active particles that are connected fixedly together, the at least one inner flow channel being formed between the particles. For example, the porosity present in the magnetocalorically active component may form the inner flow channels. In these embodiments, the magnetocaloric component is a monolithic object. A monolithic object has the advantage of being easier to handle than a powder or granulate. The magnetocalorically active particles may be connected together by means of a magnetocalorically passive material. This magnetocalorically passive material may be a solder or an adhesive. In some embodiments the individual particles are sintered together. The mean diameter of the particles may be less than 500 µm.

In some embodiments the magnetocalorically active component takes the form of a plurality of magnetocalorically active sub-units, the at least one inner flow channel being formed between the sub-units.

In some embodiments the sub-units are plate-shaped and stacked one on top of another and each have at least one recess that forms the inner flow channel. In some embodiments the sub-units are plate-shaped and formed of particles that are connected fixedly together, the inner flow channel being formed by porosity or correspondingly small through-openings.

In some embodiments the magnetocalorically active sub-units are connected together by means of a magnetocalorically passive material. As for the design of the component itself, the magnetocalorically passive material may be a solder or an adhesive. The sub-units may be formed of sintered particles.

In some embodiment the hydraulic diameter $d_{hyd}$ of the inner flow channels is <500 µm and the hydraulic diameter D of the bypass flow channels is >500 µm. These dimensions are suitable for achieving an operating frequency of at least 10 Hz with a heat exchanger that operates according to either the heat pipe or the active regenerator principle.

In some embodiments the magnetocalorically active component has a magnetocalorically active material with a composition of $La_{1-a}-R_a(Fe_{1-x-y}T_yM_x)_{13}H_xC_b$, M being Si and optionally Al, T being one of more the elements from the group comprising Mn, Co, Ni, Ti, V and Cr and R being one or more of the elements Ce, Nd, Y and Pr, where $0\leq a\leq0.5$, $0.05\leq x\leq0.2$, $0.003\leq y\leq0.02$, $0\leq z\leq3$ and $0\leq b\leq1.5$.

In practice, a magnetic heat exchanger requires a magnetocalorically active material that has a plurality of different magnetic phase transition temperatures in order to provide cooling over a broader temperature range. This can be achieved by selecting the composition appropriately within the ranges specified above.

Also provided is a heat exchanger that has at least one regenerator according to any one of the preceding embodiments, a working medium, that flows through the inner flow channel and the bypass flow channel when the heat exchanger is in operation, and a switchable magnetic field source for generating a magnetic field at the component of the regenerator.

In some embodiments at least two regenerators are provided. These regenerators have at least two different Curie temperatures. This enables the working temperature range to be extended. In some embodiments the at least two regenerators are connected in series so as to provide a cascade with increasing Curie temperatures.

In some embodiments the heat exchanger is configured according to the heat pipe principle and, in addition, has a condenser that is in flow communication with the outlet of the housing and an evaporator that is in flow communication with the inlet of the housing. In a further development the heat exchanger also has at least two regenerators and a controllable thermal connection between these two regenerators. The controllable thermal connection may comprise a pressure valve or a thermo valve. In these embodiments the magnetocalorically active component and the bypass flow channel are arranged in parallel to one another with respect to the direction of flow of the working medium.

In some embodiments the heat exchanger is configured according to the active magnetocaloric regenerator principle. In these embodiments the at least two bypass flow channels are arranged in series with respect to the mean flow direction of the working medium.

Various embodiments are described in greater detail below with reference to the drawings and examples.

BRIEF DESCRIPTION OF THE DRAWINGS

FIG. 3 shows power data for a magnetic heat pipe stage at an operating frequency of 6 Hz with and without a bypass flow channel.

DETAILED DESCRIPTION OF EXAMPLE EMBODIMENTS

Figure 1A:
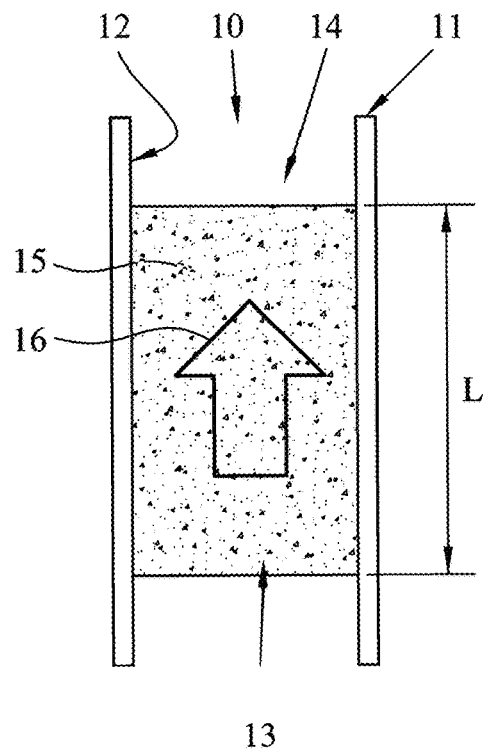
FIG. 1a shows the fluid transport in a comparison regenerator for a heat exchanger according to the heat pipe principle.
Figure 1B:
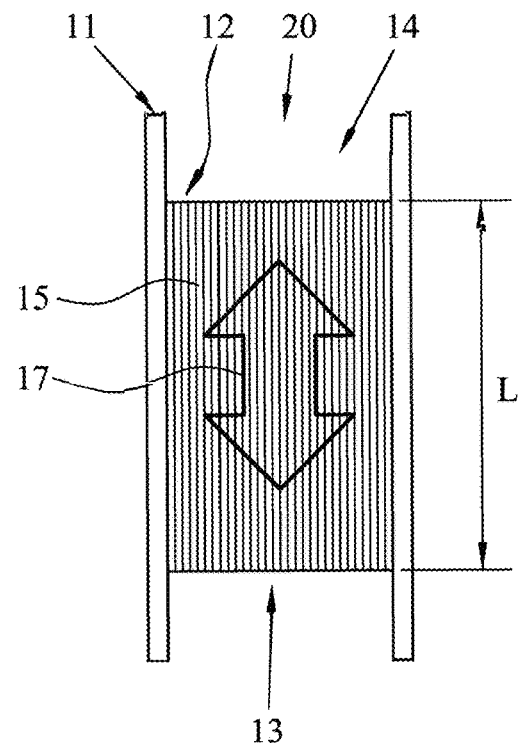
FIG. 1b shows the fluid transport in a comparison regenerator for a heat exchanger according to the active regenerator principle.

FIG. 1a shows the fluid transport in a comparison regenerator 10 for a heat exchanger according to the heat pipe principle, and FIG. 1b shows the fluid transport in a comparison regenerator 20 for a heat exchanger according to the active regenerator principle.

The regenerator 10 has a housing 11 having a chamber 12, an inlet 13 for a working medium and an outlet 14 for the working medium. The working medium may be a gas or a liquid such as water or methanol. At least one magnetocalorically active component 15 is arranged in the chamber 12 between the inlet 13 and the outlet 14 such that the working medium flows through channels in the magnetocalorically active component 15. The working medium is generally transported through the magnetocaloric material through pores or flow channels in the magnetocalorically active component 15, thereby coming into contact with the magnetocaloric material, whereby heat can be dissipated from this magnetocaloric material, the heat being generated by the periodic application of a magnetic field (not shown).

A flow direction of the working medium, the flow direction being indicated by the arrow 16, extends from the inlet 13 to the outlet 14. The cold end of the regenerator is located at the inlet 13 of the housing 11 and the warm end of the regenerator is located at the outlet 14 of the housing 11. When the heat pipe process is used, the heated fluid is discharged via the valves acting as thermal diodes on the side 14 of the regenerator 10 and conveyed to a condenser, where the working medium condenses in order to release the heat, and is sucked in at the other side 13 of the regenerator. In the process the flow 16 of the working medium is directed substantially through the regenerator 10 always in one direction.

FIG. 1b shows a regenerator 20 that operates according to the classic active regenerator principle. The regenerator 20 also has a housing 11 having a chamber 12, an inlet 13 for the working medium and an outlet 14 for the working medium as well as at least one magnetocalorically active component 15 that is arranged in the chamber 12 between the inlet 13 and the outlet 14 such that the working medium is forced to flow through channels in the magnetocalorically active component 15. In contrast to the heat pipe principle, in the classic AMR process the direction of the fluid transport changes twice in each cycle, as shown by the arrow 17 in FIG. 1b.

In both types of regenerator 10, 20 the working medium, whether it is gas or liquid, has to flow over the entire length L of the regenerator 10. The working medium may also be referred to as a coolant or a heat transfer fluid.

In a magnetocaloric cycle the heat generated by the change in the magnetic field strength is carried away by the working medium. In the process the heat has to first be transferred to the fluid via the surface of the magnetocaloric material. To make this heat transfer as efficient as possible, the specific surface of the magnetocaloric material that is in contact with the fluid is conventionally made as large as possible. This results in regenerators that comprise for example, a few 100 µm-thick plates as shown in FIG. 1b, or granulates with particle sizes of a few 100 µm, as shown in FIG. 1a, to increase the specific surface. To keep the volume of the magnetic field, which is generated by relatively costly permanent magnets, as low as possible, the filling level of the regenerator should be as high as possible. As a general rule, these two contradictory requirements result in the cross section of the flow channel via which the fluid is able to carry away the heat being significantly smaller than the internal thickness or the internal diameter of the magnetocaloric part 15.

In the classic Active Magnetic Regeneration (AMR) process it has been established that, in the case of a regenerator through which a working medium flows, this leads to undesired pressure losses that have a direct impact on efficiency. In the case of the heat pipe process, it has been established that though the gaseous fluid flowing back and forth suffers only a small pressure loss, it that leads directly to a change in the temperature of the fluid, which in turn leads to the formation of an unwanted temperature gradient. In both cases these pressure losses have the effect of restricting the maximum working frequency of magnetocaloric heat exchangers to a few Hz and thus to low power densities of <2 J/g.

The invention provides a particular form of regenerator that makes it possible to increase the working frequency of magnetocaloric heat exchangers to at least 10 Hz. This rise in working frequency increases the power density to above 10 J/g, thereby making it possible to make systems of this type considerably more compact and easier to construct. It can also considerably reduce the quantity of permanent magnets required, in particular, thereby resulting in substantial cost savings.

Based on this knowledge, as much as possible of the heat generated in a magnetisation cycle needs to be transferred from the magnetocalorically active material to the heat transfer fluid if a working frequency of at least 10 Hz is to be exploited in any sort of reasonable manner. To a first approximation, the time-temperature curve of a body in an environment at another temperature can be described as follows:

$$\Delta T \propto e^{-\frac{t}{\tau}} \qquad (1)$$

τ being the relaxation time. This approximation applies only if the body is sufficiently small to be considered thermally thin. A body may be deemed thermally thin as soon as its so-called Biot number, Bi, is less than 0.1.

$$Bi = \frac{\alpha \frac{s}{2}}{\lambda} \quad (2)$$

Here α is the heat transfer coefficient at the surface of the body, s is the thickness of the body and λ is the thermoconductivity of the body. Where Bi is <0.1, according to Newton's capacity model for τ this then gives:

$$\tau = \frac{c_p \rho V}{\alpha A} \quad (3)$$

$c_p$ being the specific thermal capacity, ρ the density, V and A the volume and the surface of the body. The ratio V/A describes a length characteristic of the body. For a sphere V/A=d/6, for a cylinder V/A=d/4 and for a plate V/A=d/2, d being the diameter or thickness.

In the first half of a magnetocaloric cycle the heat generated by turning on the magnetic field is first released into the fluid. To ensure that at least 95% of the heat is transferred, a duration of at least 3τ is required. The same duration is required to remove the heat to be pumped out of the following fluid once the magnetic field has been turned off. Disregarding the transition times between the high-field and low-field phases, a period length of at least 6 τ is therefore required for a full cycle.

For the classic AMR process, the heat transfer coefficient for the flowing water generally used as the fluid is of the order of 1000 W/m²K. A thermal conductivity of approx. 8 W/mK typical of LaFeSi results in a diameter of 1.6 mm for the critical value below which a sphere of the material can still be regarded as a thermally thin body. A mean thermal capacity of 1000 J/kgK and a density of 7200 kg/m³ at a desired frequency of 10 Hz results in a required particle diameter of only 14 µm. This diameter is sufficiently smaller than the critical diameter for the application of the approximations of Newton's capacity model. It has also been shown, however that the desire for a high working frequency due to the relatively small heat transfer coefficient leads to very small particle diameters. In the case of plate-type regenerators the situation is even less favourable since the relaxation time according to equation (3) triples for a plate of identical thickness/diameter.

For the heat pipe process, the heat transfer coefficient for evaporating or condensing water, for example, is approx. 20,000 to 50,000 W/m² K. At value of 20,000 W/m² K a critical diameter of 80 µm is required to justify approximation of the thermally thin body for the material described above. With the material data for LaFeSi, for this diameter this gives a maximum working frequency of approx. 35 Hz at which practically the total amount of heat available can still be transferred in each cycle. A regenerator with particles having a diameter of approx. 280 µm could be operated at a frequency of 10 Hz in a heat exchanger according to the heat pipe principle. For these larger particles, however, the approximation of the thermally thin body no longer applies. In this case, the relaxation time for heat exchange is determined using the thermal conduction inside the particles and can be calculated as follows:

$$\tau = \frac{c_p \rho d^2}{\pi \lambda} \quad (4)$$

When using equation (4), however, it is taken into consideration that it is based on the assumption that the heat transfer coefficient at the surface of the particle is sufficiently large compared to the thermal conduction coefficient. Ultimately, the Biot number defined in equation (2) should be significantly greater than 0.1. However, this does not alter the fact that a high heat transfer coefficient is advantageous for achieving high operating frequencies.

All in all, it should be noted that the desire for an operating frequency of at least 10 Hz correlates with the requirement to make the dimensions of the active regenerator element as small as possible as a function of the heat transfer coefficient. For the heat pipe process, the maximum permissible diameter for a LaFeSi-based magnetocaloric material is a few 100 µm, while for the classic AMR process with a fluid heat-transfer medium the maximum diameter is only 10 to 20 µm.

To order that the magnetic field volume is used as efficiently as possible, the porosity of the regenerator, or the proportion of flow channels, is conventionally kept as low as possible. In such a case porosities of approx. 20 to 40% are usual. In conjunction with the requirement, deduced above, that the dimensions of the individual regenerator elements be as small as possible, this results in the cross section of the pores or flow channels needing to be very small in order to achieve high operating frequencies. Ultimately, this means that the hydraulic diameter, defined as $d_{hyd}$=4A/U, for regenerators have to be of the order of approx. 100 µm for the heat pipe process and below 10 µm for the AMR process. Here, A is the cross-sectional area of the individual flow channels and U their circumference.

The loss of pressure undergone by a fluid as it flows through a flow channel depends on the speed, the viscosity of the fluid and, ultimately, on the hydraulic diameter. As a general rule, however, pressure loss increases as speed and viscosity increase and hydraulic diameter decreases. This shows already that the heat pipe process has advantages over the AMR process in terms of its ability to achieve high operating frequencies. Firstly, the gaseous fluid has a substantially lower viscosity and, secondly, the available flow channels have a significantly large hydraulic diameter due to the high heat transfer rate.

Despite these advantages, however, it has been shown in practice that pressure loss via a regenerator made of loose granulate is too great to be able to reasonably apply an operating frequency of 10 Hz, even for the heat pipe process. It has been established that, in addition to viscosity, speed and hydraulic diameter, pressure loss is also dependent on the length L of the regenerator.

Figure 2A:
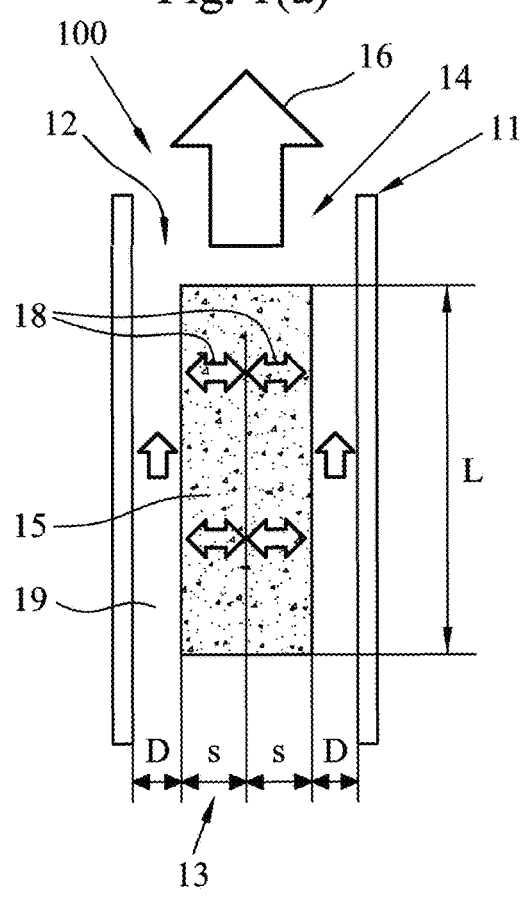
FIG. 2a shows the fluid transport in a regenerator according to the invention for a heat exchanger according to the heat pipe principle.
Figure 2B:
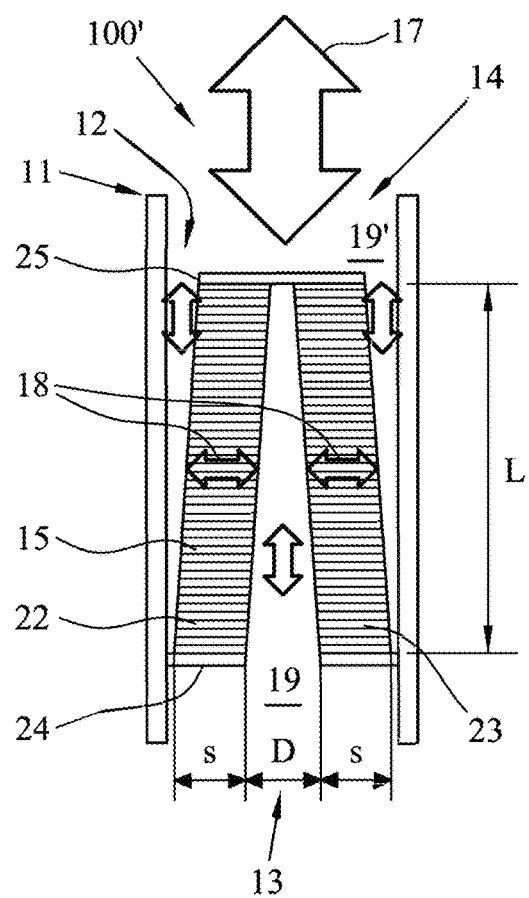
FIG. 2b shows the fluid transport in a regenerator according to the invention for a heat exchanger according to the active regenerator principle.

FIG. 2a shows a schematic representation of a regenerator 100 according to the invention for a magnetic heat exchanger that operates according to the heat pipe principle, and FIG. 2b shows a schematic representation of a regenerator 100' according to the invention for a magnetic heat exchanger that operates according to the active regenerator principle.

The regenerator 100 comprises a housing 11 having a chamber 12, an inlet 13 for a working medium and an outlet 14 for the working medium. At least one magnetocalorically active component 15 is arranged in the chamber 12 between the inlet 13 and the outlet 14.

In some embodiments the magnetocalorically active component 15 has a magnetocalorically active material with a composition of $La_{1-a}$—$R_a(Fe_{1-x-y}T_yM_x)_{13}H_xC_b$, M being Si and optionally Al, T being one of more the elements from the group comprising Mn, Co, Ni, Ti, V and Cr and being R one of more the elements Ce, Nd, Y and Pr, where 0≤a≤0.5, $0.05 \leq x \leq 0.2$, $0.003 \leq y \leq 0.2$, $0 \leq z \leq 3$ and $0 \leq b \leq 1.5$. However, alternative magnetocalorically active materials may also be used.

In this embodiment the magnetocalorically active component 15 takes the form of individual magnetocalorically active particles that are fixedly connected to one another, the at least one inner flow channel 18 being formed between the particles. The magnetocalorically active particles may be connected to one another by means of a magnetocalorically passive material such as a solder or an adhesive. Alternatively, the individual particles may be sintered to one another. The diameter of the particles may be less than 500 µm.

The magnetocalorically active component 15 has at least one inner flow channel 18 having a hydraulic diameter $d_{hyd}$. In this embodiment the inner flow channel takes the form of the pores formed between the particles in the magnetocalorically active component 15. In this embodiment there is provided a plurality of inner flow directions 18 that are distributed throughout the volume of the magnetocalorically active component 15. The chamber 12 has a volume V. Unlike the regenerator in FIG. 1, the magnetocalorically active component 15 does not fill the entire cross section of the chamber 12 so that the volume V' of the chamber 12 that us not occupied by the magnetocalorically active component 15 therefore provides at least one bypass flow channel 19. As a result, the magnetocalorically active component 15 has a total cross-sectional area a that is smaller than the inner cross-sectional area A of the chamber.

Both the inlet 13 and the outlet 14 are reached from the at least one bypass flow channel 19. The at least one inner flow channel 18 of the magnetocalorically active component 15 is in flow communication with the bypass flow channel 19. The bypass flow channel 19 has a hydraulic diameter D that is greater than the hydraulic diameter $d_{hyd}$ of the inner flow channels 18 such that $D > d_{hyd}$. The flow direction of the working medium, which is indicated schematically by the arrow 16, extends from the inlet 13 to the outlet 14 of the housing 10 and in one direction only. The magnetocalorically active component 15 and the at least one bypass flow channel 18 are arranged parallel to one another with respect to the direction of flow 16. As a consequence of this arrangement, the working medium is able to flow around the magnetocalorically active component 15 through the bypass flow channel 19 with only a small loss of pressure over the length L of the regenerator due to the large hydraulic diameter D of the bypass flow channel 19. In contrast, the flow path s of the working medium through the smaller inner flow channel 18 with the smaller hydraulic diameter $d_{hyd}$ is much shorter and, as a result, only relatively low pressure losses occur.

In the embodiment shown in FIG. 2a the bypass flow channel 19 is formed between the magnetocalorically active component 15 and the inner walls 20 of the chamber. The bypass flow channel 19 may, however, also take the form of at least one gap between the housing, or the inner walls 20 of the chamber 12, and the magnetocalorically active component 15 and/or of at least one recess in the cross section of magnetocalorically active component 15.

In most cases, however, the inner flow channels 18 run not parallel but at an angle to the flow direction 16 of the working medium. In some embodiments at least one of the inner flow channels 18 may on average run perpendicular to the flow direction 16 of the working medium.

The distance s thus indicates the theoretically shortest path by which the working medium has to flow through the magnetocalorically active component 15. The geometrical form of the regenerator 100 should be designed such that the distances over which the working medium is required to flow through the region with the small hydraulic diameter, i.e. the inner flow channels 18, is less than the total length of the regenerator L, as shown in FIG. 2. In this arrangement, this short distance s, in the direction of which the working medium flows, is preferably aligned such that the working medium is able to flow back and forth via a bypass flow channel 19 with a greater hydraulic diameter D.

The regenerator 100 may have a macroscopic porosity $\varepsilon_{macro}$ that is calculated by dividing the volume Vbs of the bypass flow channels 19 by the volume V of the chamber 12, and a microscopic porosity $\varepsilon_{micro}$ that is calculated by dividing the volume Vis of the inner flow channels 18 by the volume Vb of the magnetocalorically active component 15, where $10\% < \varepsilon_{macro} < 50\%$ and $10\% < \varepsilon_{micro} < 50\%$ and $19\% \leq \varepsilon_{total} \leq 75\%$ and the total porosity is calculated using the equation $\varepsilon_{total} = (Vbs + Vis)/V$.

In some embodiments the hydraulic diameter $d_{hydo}$ of the inner flow channels is <500 µm and the hydraulic diameter D of the bypass flow channels is >500 µm. These values are suitable for producing a heat exchanger with an operating frequency of at least 10 Hz. The regenerator 100 can be used in a magnetic heat exchanger according to the heat pipe principle since the regenerator 100 has a mean flow direction that extends from the inlet 13 to the outlet 14 in one direction only.

In this arrangement the total pressure loss is made up of the sum of the pressure loss over the short distance s with a small, microscopic hydraulic diameter $d_{hyd}$, i.e. the inner flow channels 18, and the pressure loss over the macroscopic length L of the regenerators 100 with the substantially greater hydraulic diameter D of the macroscopic bypass flow channels 18. Since the hydraulic diameter D in the macroscopic bypass flow channels 19 is substantially greater than the hydraulic diameter $d_{hyd}$ in the microscopic flow channels 18 inside the component 15, the total flow resistance of the regenerators 100 according to the invention with at least one bypass flow channel 19 is significantly lower than the regenerators that have been used to date, as shown in FIG. 1, which have no bypass flow channel since the magnetocalorically active component 15 fills the entire cross section of the chamber 12. Consequently, in the comparison regenerator 10 the working medium has to flow through the magnetocalorically active component 15 over the entire length L.

FIG. 2b shows a regenerator 100' according to the active regenerator principle that also has bypass flow channels 19 in the chamber 12 and inner flow channels 18 that are formed inside the magnetocalorically active component 15. In this embodiment the volume V' of the chamber 12 that is not occupied by the magnetocalorically active component 15 provides at least two bypass flow channels 19, 19', both of which have a hydraulic diameter D, where $D > d_{hyd}$. The at least one inner flow channel 18 of the magnetocalorically active component 15 is in flow communication with at least two of the bypass flow channels 19, 19'. One of the bypass flow channels 19 adjoins the inlet 13 and does not extend to the outlet 14, and another of the bypass flow channels 19' adjoins the outlet 14 and does not extend to the inlet 13. The at least two bypass flow channels 19, 19' are thus arranged in series with respect to one another in respect of the flow direction 17.

The magnetocalorically active component 15 has a V-shaped cross section that is formed of two parts 22, 23. The open end 25 has a width corresponding to the width of the chamber 12. As a result, a first end 24 of the magnetocaloric component 15 is connected to the inner walls of the chamber 12 at the inlet 13. The bypass flow channel 19 is thus formed between the two parts 22, 23 of the magnetocalorically active component 15 that is itself formed approximately in the centre of the cross section of the chamber 12 and adjoins the inlet 13. At the second end 25 of the magnetocalorically active component 15, the two parts 22, 23 are connected to one another to form a point. Due to the V-shape, this creates a cavity between the outer side of the magnetocalorically active component 15 and the inner walls of the chamber 12 that forms the second bypass flow channel 19' that adjoins and is in flow communication with the outlet 14. The bypass flow channel 19 is thus separated from the second bypass flow channel 19' by the magnetocalorically active component 15 and connected to it only by the inner flow channels 18 of the two parts 22,23 of the magnetocalorically active component 15. The bypass flow channels 19, 19' are thus connected to one another in series with respect to the direction of flow 17 of the working medium and connected in series to the magnetocaloric component 15. The working medium flows in two opposing directions, as shown by the double arrow.

The magnetocalorically active component 15 may, for example, take the form of a plurality of stacked plates made of a magnetocalorically active material. The inner flow channels 18 are formed by the distances between adjacent plates. In this embodiment the length s of the inner flow channels 18 is approx. the width of the individual part 22, 23. The length L of the components 22 and 23 is greater than the length s.

To order that the proposed regenerator geometries 100, 100' can also be used safely for industrial applications at operating frequencies of 10 Hz and above, it is also advantageous for the regenerators to have adequate mechanical stability. According to the invention, this is achieved by sticking or sintering the individual magnetocalorically active particles or component parts to one another. Here, sintering has the advantage that it requires no additional thermal ballast in the form of an adhesive, which may also impede the heat transfer from the magnetocalorically active material to the fluid.

The addition of additional macroscopic bypass flow channels necessarily increases the total porosity of the regenerator 100, 100', thereby reducing the filling level of the active magnetocaloric material. However, this disadvantage is easily compensated for by an increase in operating frequency such that both the gravimetric and the volumetric power density of the regenerator 100, 100' according to the invention are significantly higher than those of the comparison regenerator 10, 20.

Comparative Example

FIG. 3a shows a comparison regenerator 110, FIG. 3b shows a regenerator according to the invention according to a first embodiment and FIG. 3c shows power data for the comparison regenerator 110 and the regenerator 120 according to a first embodiment according to the invention.

In the comparison regenerator 110, 25 g of a spherical granulate 111 comprising a LaFeSi alloy with a mean particle size of approx. 500 µm were placed into a cylindrical housing 112 (diameter 20 mm) in order to obtain a magnetocaloric component 15. No bypass flow channel is provided other than the loose granulate. This arrangement was subjected to a magnetic heat pipe process at an operating frequency of 6 Hz so that the regenerator 110 conveyed the heated working medium via the valves 113, operating as thermal diodes, upstream of the outlet 14 of the regenerators 110 and to a condenser 114 (not shown in detail) at which the working medium was condensed to release the heat, and to an evaporator 115 (also not shown) upstream of the inlet 13 of the regenerator 110.

As shown in FIG. 3c, a maximum temperature difference of approx. 0.8 K and a maximum specific cooling power of approx. 0.4 W/g was achieved. In this arrangement the inner hydraulic diameter $d_{hyd}$ of approx. 200 µm is constant along the total length L of the regenerator of 23 mm; this leads to pressure losses. These pressure losses mean that this arrangement cannot be operated at a frequency of 6 Hz.

First Embodiment According to the Invention

FIG. 3b shows a regenerator 120 according to a first embodiment according to the invention in which 5 g of identical magnetocaloric material 121 has been arranged in a reticular (net-shaped) inner housing 122 in the same machine in order to form the magnetocalorically active component 15. In addition to the magnetocaloric material 121, there are also two opposing cylindrical bypass flow channels 19 with equivalent hydraulic diameters D of approx. 6 mm. At an operating frequency von 6 Hz, this arrangement according to the invention resulted in a maximum temperature difference of approx. 2.2 K and a very good specific power of approx. 6 W/g, as shown in FIG. 3c. In this arrangement the small inner hydraulic diameter $d_{hyd}$ of 200 µm acts only over the length L of 4 mm, which in this case corresponds to the distance s shown in FIG. 2. In this arrangement the regenerator has a volume of 1256 mm³ at a diameter of 20 mm such that the edge length of a cube of the same volume is approx. 10.8 mm, i.e. significantly greater than the distance s. The resulting total flow resistance is so small that the arrangements can still be operated at 6 Hz without difficulty.

Second Embodiment According to the Invention

Figure 4:
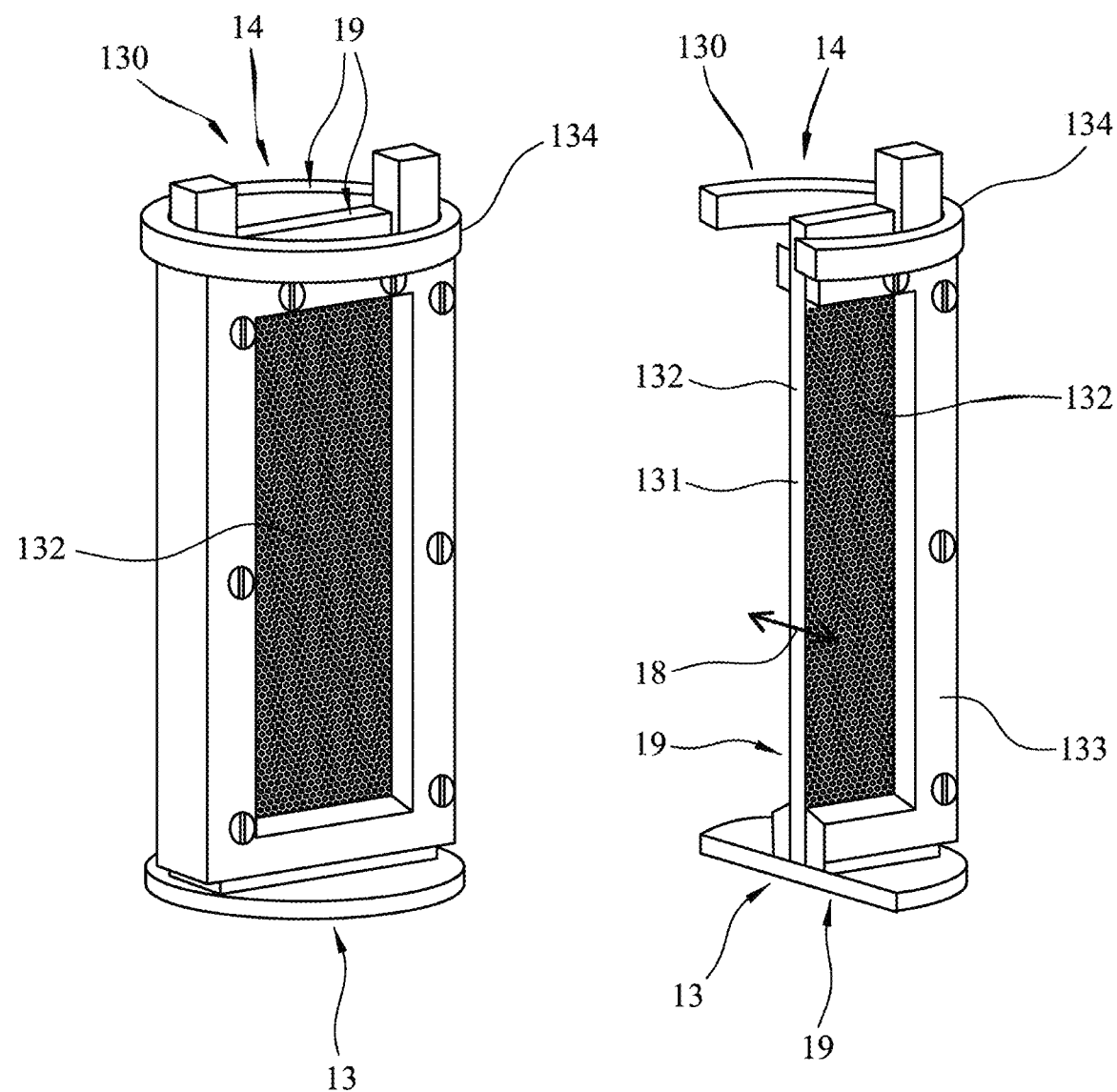
FIG. 4 shows two perspective views of a regenerator with a spherical magnetocalorically active LaFeSi granulate between two stainless steel sieves.

FIG. 4 shows two views of a regenerator 130 according to a second embodiment according to the invention, having a magnetocalorically active component 15 made of spherical LaFeSi granulate 131 arranged between two stainless steel sieves 132.

This magnetocalorically active component 15 extends between the internal walls 133 of a housing 134 (not shown) and over almost the entire length of the housing 134, thereby forming two bypass flow channels 19 on opposite sides of the component 15 between the internal walls 133 and the stainless steel sieves 132. The spherical granulate 131 is fixed between two stainless steel sieves 132 so as to result in a distance s of approx. only 1 mm corresponding to half the distance between the stainless steel sieves 132 for the effective length of the inner flow channels 18 formed by the porosity between the granulates 131. In this arrangement the hydraulic diameter D of the two bypass flow channels 19, 19' is approx. 9 mm at a length L of approx. 33 mm. The total flow resistance of this arrangement is again significantly less than in the previous example.

Figure 5:
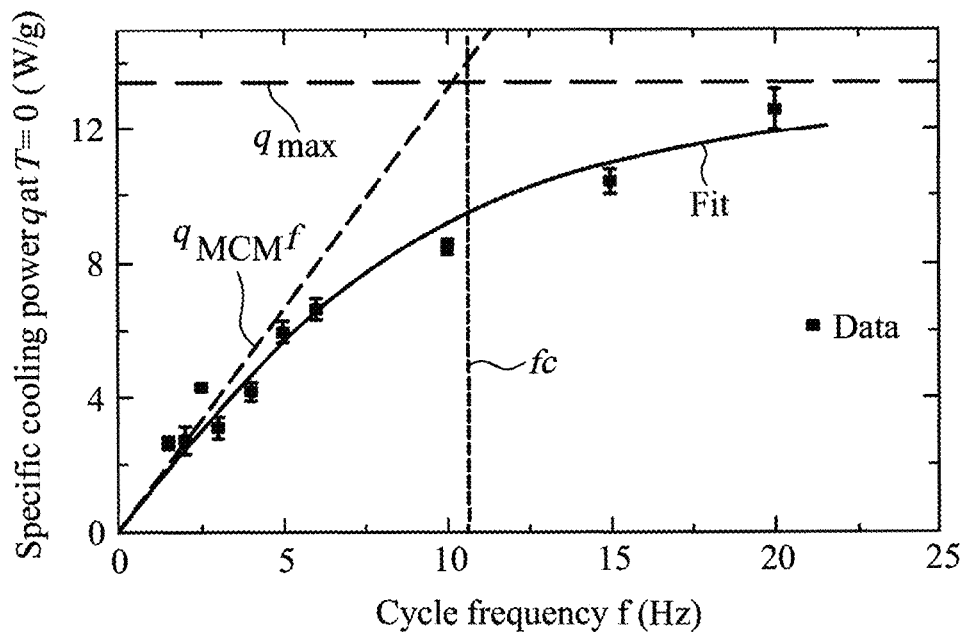
FIG. 5 shows a graph of specific cooling power for the regenerator according to the third embodiment.

This regenerator 130 was tested in the same machine as the two previous examples. FIG. 5 shows the specific cooling power for the regenerator 130 according to the second embodiment and shows that with this regenerator 130 it is possible to achieve operating frequencies of up to 20 Hz with an exceptionally high specific cooling power of approx. 12 W/g.

Third Embodiment According to the Invention

In a third embodiment according to the invention a fine powder was first produced from a LaFeSi alloy with a grain size of <10 μm. This fine powder was then compressed isostatically at a pressure of 2500 kg/cm² and sintered to a block with a density of approx. 7200 kg/m 3 at a temperature of approx. 1100° C. This block was pulverised to a coarse powder, which was then sieved to a particle size of 80 to 160 μm. This coarse powder was then poured into a silicon mould with a cross section of approx. 20×20 mm and a length of approx. 80 mm and compressed isostatically at a pressure of 2500 kg/cm².

Figure 6A:
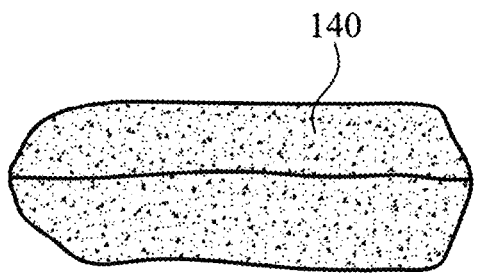
FIG. 6 shows a schematic view of a monolithic regenerator made of sintered granulate and a graph of the porosity measured at different sinter temperatures.

A plurality of these green compacts were made from the coarse granulate using this method and then sintered for 4 h at temperatures of 1050 to 1130° C. FIG. 6a shows a schematic representation of a sintered body 140 of this type with a length L of approx. 60 mm and a cross section of approx. 16×16 mm. The porosity of the sintered blanks was determined using a saturation process.

Figure 6B:
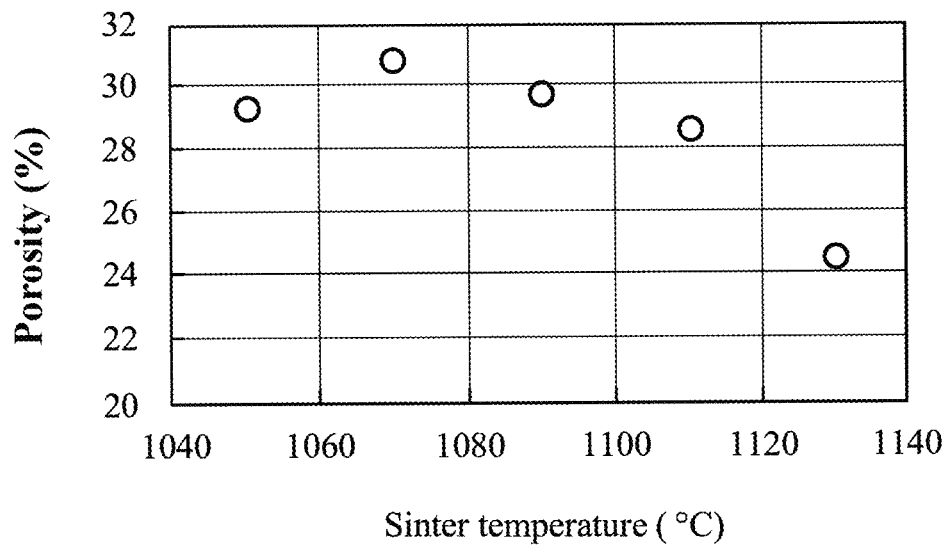

FIG. 6b shows a graph of the porosity measured for different sinter temperatures. The porosity is almost constant at approx. 30% up to a sinter temperature of 1110° C. Not until a sinter temperature of 1130° C. is reached does it drop significantly to approx. 24%. At a sinter temperature of 1050° C. the coarse powder particles are not yet sintered together sufficiently firmly and can still be rubbed off by hand. For sinter temperatures from 1070° C., on the other hand, the sintered blanks are resistant to abrasion and can used as porous regenerators.

Here, the internal hydraulic diameter $d_{hyd}$ is approx. 80 μm and the distance s, which in this case corresponds to half the thickness of the component 140, is approx. 8 mm. In this case, the hydraulic diameter of the bypass flow channel is the result of the gap between a housing and the component 140 itself. If the square component 140 in inserted into a cylindrical housing with an internal diameter of approx. 23 mm, the approx. 60 mm-long bypass flow channel has a hydraulic diameter of D=approx. 4.7 mm.

Fourth Embodiment According to the Invention

In the fourth embodiment according to the invention a LaFeSi alloy is cast into flakes with a thickness of approx. 300 μm using the strip casting process. The alloy is then homogenised at 1050° C. for 4 h so that α-Fe precipitated out during solidification is dissolved again. In the next step, the alloy is then crushed mechanically to form a coarse powder and sieved to a particle size of 150 to 300 μm. This coarse powder is then pressed at a pressing force of 1500 kg/cm² in a ring tool to form small rings D6×D2×10 mm. The rings are then sintered at a temperature of approx. 1100° C. for 4 h to form moulded bodies with an open internal porosity of approx. 30% and an internal hydraulic diameter of approx. 150 μm. After sintering the sintered blanks are then homogenised again at a temperature of 1050° C. for 6 h to allow the α-Fe formed during sintering together with the fluid phase to convert back to the magnetocalorically active 1:13 phase. Finally, the sintered blanks are cooled from 500° C. to room temperature in a hydrogen atmosphere over 24 h in order to set the Curie temperature to a value close to room temperature.

Figure 7:
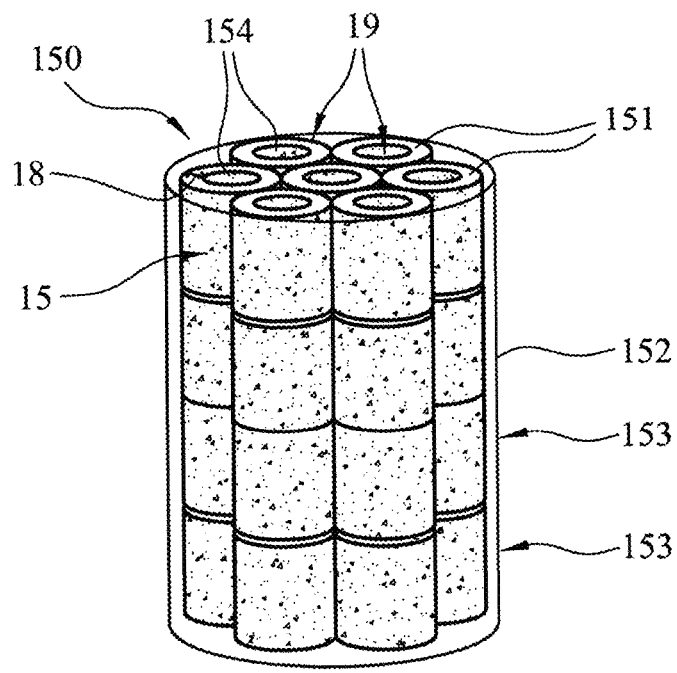
FIG. 7 shows a schematic view of a regenerator according to the invention comprising ring-shaped open-pored sintered components.

FIG. 7 shows a schematic representation of a regenerator 150 in which these rings 151 are assembled in a cylindrical housing 152 to form a magnetocalorically active component 15. The rings 151 form sub-units of the magnetocalorically active component 15. A plurality of rings 151 is arranged one next to another in a layer 153 and a plurality of similar layers are stacked one on top of another such that the rings form a plurality of multi-part pipes 154 that run parallel to one another in flow direction 16. Bypass flow channels 19 are provided through the openings in the centre of each of the rings 151 that form the pipes and through the cavities 155 that are formed between the inner walls of the housing 152 and the outer walls of the rings 151. The inner flow channels 18 are formed by the porosity of the rings 151.

In this arrangement the total length L of the regenerator 150 is approx. 40 mm and the distance s, which in this case corresponds to half of the wall thickness of the rings 151, is only 1 mm. Since, at D=2, the hydraulic diameter of the bypass flow channels 19 mm is orders of magnitude greater than that of the inner flow channels 18, the total flow resistance of this regenerator is almost 40 times less than that of a regenerator that is completely filled with granulate such as the regenerator 10 in the comparative example. In this embodiment the additional bypass flow channels 19 result in a macroscopic porosity of $\varepsilon_{macro}$=approx. 30%. Together with the inner porosity of $\varepsilon_{micro}$=approx. 30% this results in a total porosity of $\varepsilon_{total}$=approx. 50%. At 50% the filling level of this type of regenerator 150 is significantly lower than that of a regenerator 10 completely filled with granulate, which stands at approx. 70%, the lower flow resistance permits an operating frequency that is factors higher, which more than compensate for the disadvantage of the lower filling level.

Figure 8:
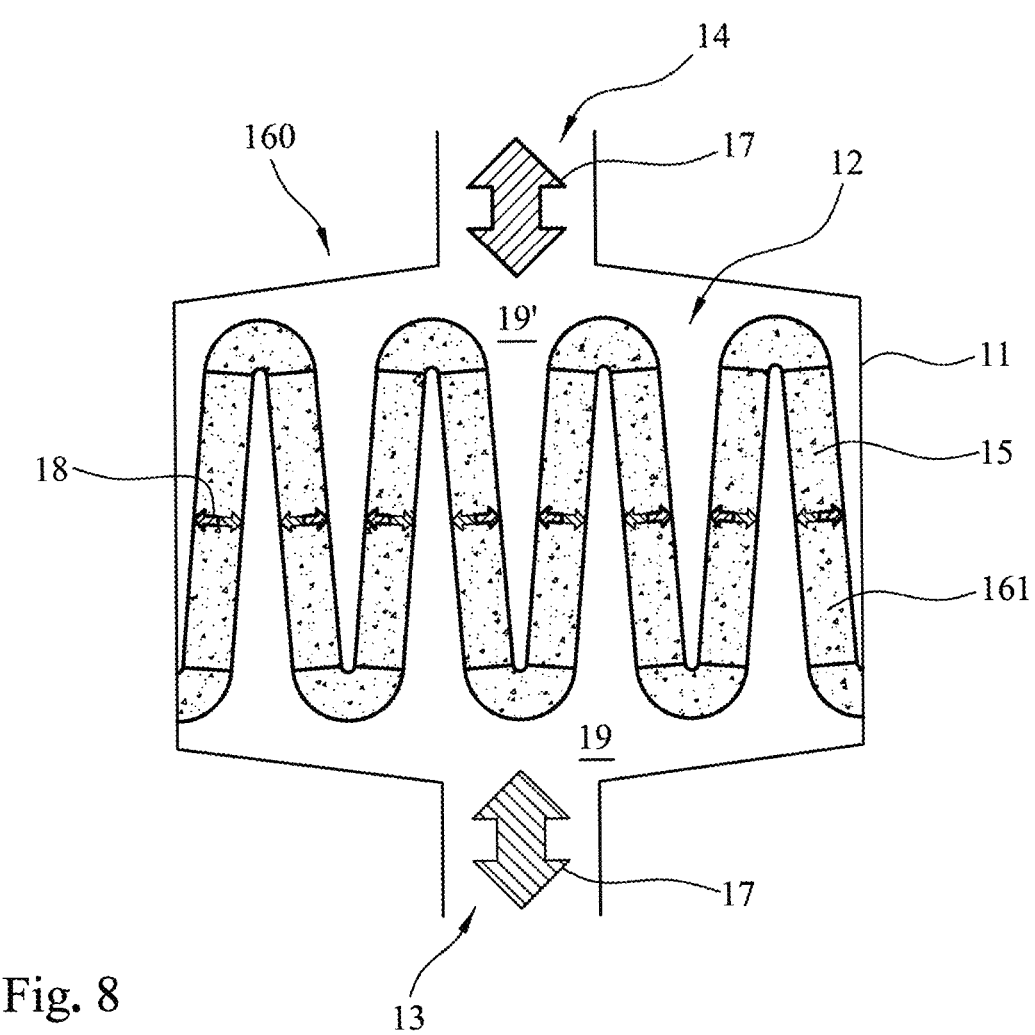
FIG. 8 shows a regenerator according to the invention for a heat exchanger according to the active regenerator principle.

The embodiments described previously are primarily suitable for the heat pipe process in which the gaseous fluid flows spontaneously into or out of the porose structure in one direction due to the pressure differences caused by the temperature differences. FIG. 8 shows a regenerator 160 according to the invention according to a fifth embodiment that can be used for the classic active regenerator process.

Fifth Embodiment According to the Invention

FIG. 8 shows a regenerator 160 according to the invention according to a fifth embodiment in which the magnetocalorically active component 15 extends over the entire cross section of the chamber 12 of the housing 11. This forms two bypass flow channels 19, 19' on opposing sides of the component 15 inside the housing 10 that are arranged in series with respect to the direction of flow 17, i.e. the working medium flows first through the inlet and the bypass flow channel 19, through the inner flow channels of the component 15 and then through the second bypass flow channel 19' and the outlet 14.

In the fifth embodiment according to the invention a LaFeSi alloy is atomised out of the molten mass by means of an argon beam to form spherical particles with a particle size of approx. 30 to 300 μm. This granulate, which has a mean particle size of approx. 125 μm, is first mixed with 3% w/w polypropylene carbonate (PPC) as a binder. The binder is dissolved in methyl ethyl ketone (MEK) in order to obtain a pourable slurry. The slurry is then cast onto a plastic film using a casting tray. In the process, the plastic film moves under the casting tray at a speed of approx. 1 m/min, creating a foil approx. 1 mm due to a gap set by means of a doctor blade. In the next step the MEK is dried, and a flexible film is created. This film is then cut into approx. 20 mm-wide strips and the strips are folded into a meander shape, as shown in FIG. 8. These meander-shaped brown compacts are then placed on their edges on a sintering plate made of Fe. The binder is them removed in a hydrogen atmosphere at a temperature of approx. 350° C. and the resulting green compact is sintered at a temperature of approx. 1100° C. for 4 h and homogenised at 1050° C. for 6 h. Finally, the sintered blanks are cooled to room temperature again in a hydrogen atmosphere at 500° C. over 24 h in order to bring the Curie temperature into the range of room temperature.

The meander-shaped plate 161 obtained in this manner is used as a magnetocalorically active component 15. It is mounted in a housing 11 such that the ends and sides of the regenerator 160 fit tightly against the housing 11. The regenerator has wedge-shaped bypass flow channels 19, 19' with a mean hydraulic diameter D of approx. 1 mm. The bypass flow channels 19, 19' are formed on opposing sides of the plate 161 and, unlike the arrangement of embodiments 1 to 3 according to the invention, are thus arranged in series with respect to the mean flow direction 17 and the magnetocaloric component 15. The inner hydraulic diameter formed by the porosity of the plate 161, on the other hand, is only approx. 80 µm. The macroscopic length of the regenerator 160 is approx. 10 mm, while the distance s, here the thickness of the sintered plate 161, is only 1 mm. Due to the particular arrangement of the macroscopic bypass flow channels 19, 19', the regenerator 160 according to the fifth embodiment according to the invention has only approximately one tenth of the flow resistance of a regenerator completely filled with a comparable granulate, such as the regenerator 10 in the comparative example. In this particular case, the spherical form of the underlying particles results in a further reduction in the flow resistance compared to regenerators made of broken granulate.

The invention claimed is:

1. A regenerator for a magnetic heat exchanger, comprising:
   a housing having a chamber, an inlet for a working medium and an outlet for the working medium, the chamber having a volume V,
   at least one magnetocalorically active component that is arranged in the chamber between the inlet and the outlet and that has at least one inner flow channel with a hydraulic diameter $d_{hyd}$,
      wherein the volume of the chamber that is not occupied by the magnetocalorically active component provides at least one bypass flow channel, wherein both the inlet and the outlet are reached from the at least one bypass flow channel, and this bypass flow channel has a hydraulic diameter D, where $D > d_{hyd}$ and wherein the at least one inner flow channel of the magnetocalorically active component is in flow communication with the bypass flow channel,
      wherein a flow direction of the working medium extends from the inlet to the outlet, and the magnetocalorically active component and the at least one bypass flow channel are arranged in parallel with one another with respect to the direction of flow.

2. A regenerator according to claim 1, wherein a shortest length s of the at least one inner flow channel is shorter than a length L of the magnetocalorically active component measured in the direction of the mean flow direction of the working medium.

3. A regenerator according to claim 1, wherein the magnetocalorically active component comprises a total cross-sectional area a that is smaller than an inner cross-sectional area A of the chamber so that the bypass flow channel is formed between the magnetocalorically active component and the chamber.

4. A regenerator according to claim 1, wherein the bypass flow channel is surrounded by the magnetocalorically active component.

5. A regenerator according to claim 1, wherein the bypass flow channel comprises the form of at least one gap between the housing and the magnetocalorically active component and/or at least one recess in the cross section of the magnetocalorically active component.

6. A regenerator according to claim 1, wherein the magnetocalorically active component comprises a plurality of sub-units, and the bypass flow channel comprises the form of at least one gap created between the sub-units.

7. A regenerator according to claim 6, wherein the sub-units are arranged adjacent to one another and transverse to the flow direction of the working medium in the chamber and/or are arranged one on top of another and parallel to the flow direction of the working medium in the chamber.

8. A regenerator according to claim 1, further comprising a macroscopic porosity $\varepsilon_{macro}$ that is calculated by dividing the volume Vbs of the bypass flow channel by the volume V of the chamber and a microscopic porosity $\varepsilon_{micro}$ that is calculated by dividing volume Vis of the inner flow channels divided by the volume Vb of the magnetocalorically active component, where $10\% < \varepsilon_{macro} < 50\%$ and $10\% < \varepsilon_{micro} < 50\%$ and $19\% \leq \varepsilon_{total} \leq 75\%$, wherein the total porosity $\varepsilon_{total}$ is calculated using the formula $\varepsilon_{total} = (Vbs + Vis)/V$.

9. A regenerator according to claim 1, wherein the magnetocalorically active component is formed by individual magnetocalorically active particles that are connected fixedly together, wherein the at least one inner flow channel is formed between the particles.

10. A regenerator according to claim 9, wherein the magnetocalorically active particles are connected fixedly together by means of a magnetocalorically passive material.

11. A regenerator according to claim 10, wherein the magnetocalorically passive material is a solder or an adhesive.

12. A regenerator according to claim 9, wherein the individual particles are sintered together.

13. A regenerator according to claim 9, wherein the mean diameter of the particles is <500 µm.

14. A regenerator according to claim 1, wherein the magnetocalorically active component has the form of a plurality of magnetocalorically active sub-units, and the at least one inner flow channel is formed between these sub-units.

15. A regenerator according to claim 14, wherein the sub-units are plate-shaped and stacked one on top of another and each has at least one recess that forms the inner flow channel.

16. A regenerator according to claim 14, wherein the magnetocalorically active sub-units are connected fixedly together by a magnetocalorically passive material.

17. A regenerator according to claim 16, wherein the magnetocalorically passive material is a solder or an adhesive.

18. A regenerator according to claim 14, wherein the sub-units have the form of sintered particles.

19. A regenerator according to claim 1, wherein the hydraulic diameter $d_{hyd}$ of the inner flow channels is <500 µm and the hydraulic diameter D of the bypass flow channels is >500 µm.

20. A regenerator according to claim 1, wherein the magnetocalorically active component comprises a magnetocalorically active material with a composition of $La_{1-a}R_a(Fe_{1-x-y}T_yM_x)_{13}H_xC_b$, M is Si and optionally Al, T is one or more of the elements from the group comprising Mn, Co, Ni, Ti, V and Cr and R is one of more the elements Ce, Nd, Y and Pr, where $0 \leq a \leq 0.5$, $0.05 \leq x \leq 0.2$, $0.003 \leq y \leq 0.2$, $0 \leq z \leq 3$ and $0 \leq b \leq 1.5$.

21. A heat exchanger, comprising
   at least one regenerator according to claim 1,
   a working medium that flows through the inner flow channel and the bypass flow channel when the heat exchanger is in operation,
   a switchable magnetic field source for generating a magnetic field at the component of the regenerator.

22. A heat exchanger according to claim 21, wherein at least two regenerators are provided, and these regenerators have at least two different Curie temperatures.

23. A heat exchanger according to claim 22, wherein the at least two regenerators are connected in series in such a manner as to provide a cascade with increasing Curie temperatures.

24. A heat exchanger according to claim 21, wherein the heat exchanger is configured according to the heat pipe principle and, in addition has a condenser that is in flow communication with the outlet of the housing and an evaporator that is in flow communication with the inlet of the housing.

25. A heat exchanger according to claim 24, further comprising an adjustable thermal connection between two regenerators.

26. A heat exchanger according to claim 25, wherein the adjustable thermal connection comprises a pressure valve or a thermo valve.

27. A heat exchanger according to claim 21, wherein the heat exchanger is configured according to the active magnetocaloric regenerator principle.

28. A regenerator for a magnetic heat exchanger, comprising:
   a housing having a chamber, an inlet for a working medium and an outlet for the working medium, the chamber having a volume V,
   at least one magnetocalorically active component that is arranged in the chamber between the inlet and the outlet and has at least one inner flow channel with a hydraulic diameter $d_{hyd}$,
   wherein the volume of the chamber that is not occupied by the magnetocalorically active component provides at least two bypass flow channels that each have a hydraulic diameter D, where $D > d_{hyd}$, wherein the at least one inner flow channel of the magnetocalorically active component is in flow communication with at least two of the bypass flow channels,
   wherein at least one bypass flow channel adjoins the inlet and at least one other bypass flow channel adjoins the outlet, and the at least two bypass flow channels are arranged in series with one another with respect to the direction of flow.

* * * * *